United States Patent
Diot et al.

(10) Patent No.: US 9,473,743 B2
(45) Date of Patent: Oct. 18, 2016

(54) DEVICE AND METHOD FOR OPTIMIZING ACCESS TO CONTENTS BY USERS

(75) Inventors: Christophe Diot, Paris (FR); Laurent Massoulie, Vaucresson (FR); Dan-Cristian Tomozei, Paris (FR)

(73) Assignee: THOMSON LICENSING, Issy Les Moulineaux (FR)

(*) Notice: Subject to any disclaimer, the term of this patent is extended or adjusted under 35 U.S.C. 154(b) by 603 days.

(21) Appl. No.: 12/735,027

(22) PCT Filed: Dec. 9, 2008

(86) PCT No.: PCT/EP2008/067080
§ 371 (c)(1),
(2), (4) Date: Jun. 10, 2010

(87) PCT Pub. No.: WO2009/074558
PCT Pub. Date: Jun. 18, 2009

(65) Prior Publication Data
US 2010/0274760 A1 Oct. 28, 2010

(30) Foreign Application Priority Data

Dec. 11, 2007 (EP) .................................. 07301657
May 23, 2008 (EP) .................................. 08305196

(51) Int. Cl.
*G06F 17/30* (2006.01)
*H04N 7/173* (2011.01)
(Continued)

(52) U.S. Cl.
CPC ...... *H04N 7/17318* (2013.01); *H04N 21/2181* (2013.01); *H04N 21/2312* (2013.01);
(Continued)

(58) Field of Classification Search
CPC .................... G06F 17/30575; H04N 21/2181
USPC ................................ 707/734; 725/45, 46, 47
See application file for complete search history.

(56) References Cited

U.S. PATENT DOCUMENTS 6,003,030 A   12/1999 Kenner et al.
6,067,565 A * 5/2000 Horvitz ........................ 709/218
(Continued)

FOREIGN PATENT DOCUMENTS

CA   2342186   3/2000
CA   2308280   12/2000
(Continued)

OTHER PUBLICATIONS

Kyoungwon et al., "Push-to-Peer Video-on-Demand System: Design and Evaluation" IEEE Journal on Selected Areas in Communications, vol. 25, No. 9, Dec. 1, 2007, pp. 1706-1716.
(Continued)

*Primary Examiner* — Robert Beausoliel, Jr.
*Assistant Examiner* — Nirav K Khakhar
(74) *Attorney, Agent, or Firm* — Tutunjian and Bitetto, P.C.

(57) ABSTRACT

A control device belongs to a network equipment connected to a communication network to which are coupled communication equipments of users capable of storing contents. This control device comprises i) a first analyzing means arranged for determining respective popularities of contents of a collection from at least user information, and for determining a number of replicas for each content of this collection from at least its determined content popularity, and/or ii) a second analyzing means arranged for determining content preference(s) of users from content ratings, and iii) a computation means arranged for determining location(s) for storing the replica(s) of each content, from the determined content replica numbers and/or the determined user's content preferences, in order to optimize the access to these contents by the users.

27 Claims, 1 Drawing Sheet

(51) Int. Cl.
*H04N 21/218* (2011.01)
*H04N 21/231* (2011.01)
*H04N 21/2312* (2011.01)
*H04N 21/25* (2011.01)
*H04N 21/658* (2011.01)
*H04L 12/18* (2006.01)

(52) U.S. Cl.
CPC ...... *H04N21/23103* (2013.01); *H04N 21/252* (2013.01); *H04N 21/6582* (2013.01); *H04L 12/1859* (2013.01)

(56) References Cited

U.S. PATENT DOCUMENTS

| | | | |
|---|---|---|---|
| 8,549,150 B1* | 10/2013 | Roseman | H04N 21/2181 370/351 |
| 8,676,862 B2* | 3/2014 | Kushwah et al. | 707/804 |
| 2003/0172163 A1 | 9/2003 | Fujita et al. | |
| 2004/0010588 A1* | 1/2004 | Slater | H04L 29/06027 709/224 |
| 2004/0064832 A1 | 4/2004 | Tsukidate et al. | |
| 2004/0237097 A1 | 11/2004 | Covell et al. | |
| 2004/0260769 A1 | 12/2004 | Yamamoto | |
| 2006/0179001 A1 | 8/2006 | Kim et al. | |
| 2006/0271972 A1* | 11/2006 | Pai et al. | 725/86 |
| 2007/0124781 A1* | 5/2007 | Casey | H04N 7/17318 725/94 |
| 2007/0208751 A1* | 9/2007 | Cowan et al. | 707/10 |
| 2009/0083394 A1 | 3/2009 | Diot et al. | |
| 2009/0089433 A1* | 4/2009 | Kisel et al. | 709/226 |

FOREIGN PATENT DOCUMENTS

| | | |
|---|---|---|
| KR | 20060012633 | 11/2004 |
| KR | 20070022335 | 2/2007 |
| KR | 20060090139 | 8/2016 |
| WO | WO2006059476 | 6/2006 |
| WO | WO2007/080345 | 7/2007 |

OTHER PUBLICATIONS

Search Report dated Jun. 4, 2009.
Kawasaki, Yohei et al., "Popularity-Based Content Replication in Peer-to-Peer Networks", Computational Science—ICCS 2006 Lecture Notes in Computer Science, Springer, Berlin, Jan. 1, 2006, pp. 436-443.
Boppana, et al., "Eigenvalues and Graph Bisection: An Average-case Analysis", IEEE, Oct. 1987, pp. 280-285.
Condon, et al., "Algorithms for Graph Partitioning on the Planted Partition Model", Mar. 1999, pp. 221-232.
Loeser, et al., Content Distribuition in Heterogenous Video on Demand P2P Networks with ARIMA Forecasts, Institute of Computer Science, University of Padeborn, Germany, Apr. 2005, 10 Pages.
"Push-to-Peer VoD-System Dimensioning", Appendix A, 9 Pages.
"Spectral-Clustering-and-Markov-Tree-Models-for-Collaborative-Filtering", Appendix B, 12 Pages.
Xu, et al., Optimal Replica Placement on Transparent Replication Proxies for Read Write Data, IEEE, Sep. 2002, pp. 103-110.

* cited by examiner

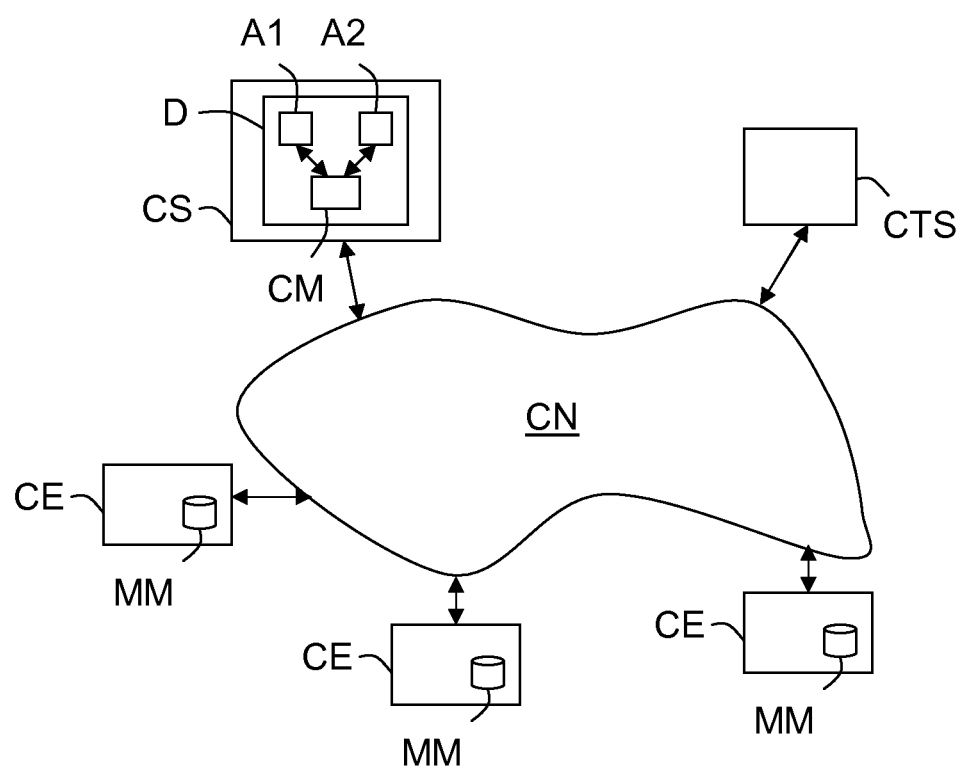

DEVICE AND METHOD FOR OPTIMIZING ACCESS TO CONTENTS BY USERS

This application claims the benefit, under 35 U.S.C. §365 of International Application PCT/EP2008/067080, filed Dec. 9, 2008, which was published in accordance with PCT Article 21(2) on Jun. 18, 2009 in English and which claims the benefit of European patent application No. 07301657.8, filed Dec. 11, 2007 and European patent application No. 08305196.1, filed May 23, 2008.

TECHNICAL FIELD

The present invention relates to content distribution services, such as Video-on-Demand (VOD) services for instance.

One means here by "content distribution service" a service allowing a client to download content(s) that are provided by a service provider through a communication network.

BACKGROUND OF THE INVENTION

As it is known by the man skilled in the art, a traditional architecture to provide content distribution services, such as VOD services to Internet-connected users, is a Client-Server architecture in which users (clients) download the desired content(s) from a server managed by a service provider and connected to a communication network.

More recently, solutions based on a peer-to-peer (P2P) approach have been developed. In the first generation of such peer-to-peer solutions the users were only authorized to store the content(s) they download for their own use, on a temporary basis. As a result, users might download a content of interest only from other users currently consuming the same content, or from the content servers.

In the last few years, a more powerful peer-to-peer architecture has been proposed. In this architecture, users can proactively download content(s) that they are not immediately interested in, but that they might serve to other interested users in the future. This architecture is intended for reducing the amount of infrastructure (server) resources that is required to meet a target quality of service, and hence for reducing the overall cost of infrastructure deployment.

This last architecture can be used, for instance, in the two following specific contexts.

In an "open Internet" context (or open uncontrolled environment), users interact with one another and with the infrastructure servers via their personal computers (or more generally communication equipments) that are connected to the Internet. So, a proactive storage of content(s), managed by the users themselves, can be easily done on the hard disk of the user's personal computer (or equipment).

In an "edge device network" context, the interacting components are either home gateways (connected through DSL or cable) or set-top boxes (STBs) that are located in the user's home premises. In this context, all the edge devices can be controlled by the Internet service provider(s) (ISP(s)) to which the users subscribe. So a proactive storage of content(s) can be done on hard disks of these edge devices.

To reap all the benefits of the last mentioned P2P architecture, it is critical to make adequate decisions regarding which content to proactively store, and where to store it. This issue has been notably considered in the article of K. Suh et al., "Push-to-Peer Video-on-Demand system: design and evaluation", IEEE Journal in Selected Areas in Communications, December 2007. In this article two strategies have been proposed, namely the "full striping" and the "coding based" placement strategies. These strategies achieve optimal performance but only when the same amount of data is stored for each content and when no information is available on user's preferences.

The prior art document WO 2007/080345 (Thomson Licensing) discloses a multimedia content delivery method and system. The method disclosed in this prior PCT patent application comprises:
a first step comprising a download in "push" mode of a multimedia content, in a partial way, from a content server to a first client device, and
a second step comprising a download of the missing elements of said multimedia content in "pull" mode via a "peer to peer" mechanism from a second client device.

SUMMARY OF THE INVENTION

So the object of this invention is to improve the situation.

For this purpose, the invention provides a control device, for a network equipment connected to a communication network to which are coupled communication equipments of users capable of storing contents, and comprising:
a first analyzing means arranged for determining respective popularities of contents of a collection from at least user information, and for determining a number of replicas for each content of this collection from at least its determined content popularity,
and/or a second analyzing means arranged for determining content preference(s) of users from content ratings,
and a computation means arranged for determining location(s) for storing the replica(s) of each content from the determined content replica numbers and/or the determined user's content preferences, in order to optimize the access to these contents by the users.

The control device according to the invention may include additional characteristics considered separately or combined, and notably:
its first analyzing means may be arranged for determining respective popularities of a collection of contents from user information that are chosen in an information group comprising at least one of the past uses of contents by users, the forecast uses of contents by users, and the appreciations of users relative to previously accessed contents;
it may be arranged to receive user's reports comprising user information relative to their past uses of contents and/or their appreciations of previously accessed contents;
its first analyzing means may be also arranged for determining respective popularities of a collection of contents from additional information relative to network topology;
the network topology information may comprise at least information relative to communication capacities and storage capacities of the user communication equipments;
its first analyzing means may be arranged for determining a number of concurrent content requests that are expected from the users for each content of the collection, from its determined content popularity, and for determining a partition of the contents in a chosen number of groups from these determined numbers of concurrent content requests and from communication capacities and storage capacities of the user communication equipments;

its first analyzing means may be arranged for determining a partition of the contents in three groups, a first group comprising contents whose replicas must be stored into the communication equipments of each user of at least one chosen user group, a second group comprising contents whose replicas must be stored into the communication equipment of one user of at least one chosen user group, and a third group comprising contents whose replicas must be stored into at least one chosen network equipment;

in a variant, its first analyzing means may be arranged for determining a partition of the contents in a variable number of groups from communication capacities and storage capacities of the user communication equipments and from mean value and variance of numbers of concurrent content requests that are expected from the users for each of the contents of the collection;

its second analyzing means may be arranged for determining a partition of the users into clusters from the user content ratings, then for determining a model of user preference(s) for each of these clusters, then for determining the content(s) that are likely to be of interest to each user of each cluster from its determined user preference model;

its second analyzing means may be arranged for determining the user preference model of each cluster by applying a maximum likelihood approach to the user content ratings;

its second analyzing means may be arranged for determining each user preference model of each cluster into a class of statistical models (for instance the one called "tree-structured Markov random fields");

its computation means may be arranged for generating recommendations signaling content(s) to be stored for at least some of the users and for requiring the transmission of these recommendations to the communication equipments of the corresponding users, from its network equipment;

its computation means may be arranged for requiring the transmission of the replicas of each content in their corresponding determined locations, from its network equipment.

The invention also provides a network equipment, for a communication network to which are coupled communication equipments of users capable of storing contents, and comprising a control device such as the one above introduced.

The invention also provides a method, intended for optimizing the access to contents by users comprising communication equipments coupled to a communication network, and comprising the steps of:

determining respective popularities of contents of a collection from at least user information, and then determining a number of replicas for each content of this collection from at least its determined content popularity, and/or determining content preference(s) of users from content ratings, and determining location(s) for storing the replica(s) of each content from the determined content replica numbers and/or the determined user's content preferences.

BRIEF DESCRIPTION OF THE FIGURES

Other features and advantages of the invention will become apparent on examining the detailed specifications and Annexes hereafter and the appended drawing, wherein the unique FIGURE schematically illustrates a control server comprising an example of embodiment of a control device according to the invention, and connected to a communication network to which are also coupled a content server and communication equipments of users.

DETAILED DESCRIPTION OF THE PREFERRED EMBODIMENT

The appended drawing may serve not only to complete the invention, but also to contribute to its definition, if need be.

The invention aims at offering a control device, and an associated method, intended for optimizing the access to contents by users which are equipped with communication equipments CE that are coupled to a communication network CN.

In the following description it will be considered that contents are videos (or movies) which can be transmitted to user communication equipments CE that are connected to Internet through at least one DSL (or optical fiber or else cable) communication network CN. But the invention is not limited to this application. Indeed, it concerns any type of digital content and notably audio (or music) files and data files.

Moreover, the user communication equipments CE may be of any type as soon as, on the one hand, they comprise, or are coupled to, a memory means MM intended for storing contents, and on the other hand, they are capable of establishing communications therebetween in a peer-to-peer (P2P) mode. So a user communication equipment CE may be a fixed personal computer, a laptop, a content receiver (for instance a home gateway or a set-top box (STB) located in the user's home premise), a mobile or cellular telephone, or a personal digital assistant (PDA), provided that it comprises a communication modem (or any equivalent communication means). So, the communication network(s) CN, to which user communication equipments CE are connected, may be of any type (fixed or wireless), provided that it is capable of offering content distribution services, such as video-on-demand (VOD) services for instance.

In the following description it will be considered that the user communication equipments CE are home gateways of users that are clients of a content provider comprising at least one content server CTS coupled to the communication network CN.

As it is schematically illustrated in the unique FIGURE, a control device D according to the invention comprises at least a computation module CM and a first analyzing module A1 and/or a second analyzing module A2. In other words, a control device D comprises either a computation module CM, a first analyzing module A1 and a second analyzing module A2, or a computation module CM and a first analyzing module A1, or else a computation module CM and a second analyzing module A2.

As illustrated in the non limiting example, a control device D may be localized into a network equipment CS, such as a control server, connected (or coupled to) the communication network CN. But, such a control device D may be also coupled to a network equipment CS.

Moreover, a control device D is preferably made of software modules, at least partly. But it could be also made of electronic circuit(s) or hardware modules, or a combination of hardware and software modules (in this case the control device D comprises also a software interface allowing interworking between the hardware and software modules). In case where it is exclusively made of software modules it can be stored in a memory of a network equipment or in any computer software product, such as a CD-ROM, for instance, which can be read by a network equipment.

In the following description it will be considered that the control device D is dedicated to the optimization of the access to a single collection of contents that "belongs" to only one content provider. But a control device D may be dedicated to the optimization of the access to several collections of contents belonging to several content providers.

The first analyzing module A1 (of a control device D) is notably intended for determining respective popularities of contents of a collection from at least user information.

One means here by "user information" an information which defines a relation between a content and a user. So, it may be a past use of content by a user, a user appreciation relative to a previously accessed content or the forecast use of a content by a user.

It is important to note that at least some of the user information may be provided to the control device D (or its control server CS) by the users themselves, through reports. For instance, a user report may comprise user information relative to its past uses of contents and/or its appreciations of previously accessed contents. Such user reports may be transmitted by the user (communication) equipments CE to the control device D (or its control server CS) either spontaneously (for instance periodically) or on request of the control device D. But at least some of the user information may be also provided by the service provider, possibly after an analysis of the data relative to the content consumption of its clients it has collected near its own network equipments and/or near any other network access provider. This last user information may be the forecast uses of contents by the users that may be determined by a content provider before putting them at the user's disposal based on additional information.

It is also important to note that the first analyzing module A1 may determine the content popularities not only from the user information but also from additional information which is for instance relative to network topology, such as communication capacities and storage capacities of the user equipments CE.

When the first analyzing module A1 has determined the content popularities of a collection, it is arranged for determining a number of replicas for each content of the collection from at least its own determined content popularity.

For this purpose, the first analyzing module A1 may, for instance, first determine the number of concurrent content requests that are expected from the users for each content of the collection, taking into account its own determined content popularity. Then, it may determine a partition of these contents into a chosen number of groups, from the determined numbers of concurrent content requests and from communication capacities and storage capacities of the user equipments CE.

In this first method the partition of contents may be carried out into three groups. A first group may be dedicated to "hot" contents. It comprises contents whose replicas must be stored into the equipments CE of each user of at least one chosen user group. A second group may be dedicated to "warm" contents. It comprises contents whose replicas must be stored into the equipment CE of one user of at least one chosen user group. A third group may be dedicated to "cold" contents. It comprises contents whose replicas do not need to be stored into the user premises, and therefore are stored into at least one chosen network equipment, such as the content server CTS, and can only be obtained near the latter, at least for the first access.

The above mentioned first method is optimal when the predictions of the number of concurrent requests for each content are exact. When this is not the case, the first analyzing module A1 must implement a second method. For instance, it may determine the partition of the contents in a variable number of groups, from the communication capacities and storage capacities of the user equipments CE and from the mean value and variance of the numbers of concurrent content requests that are expected from the users for each content.

More detailed examples of implementation of the two above mentioned methods are described in Annex 1.

The second analyzing module A2 (of a control device D) is arranged for determining content preference(s) of users from content ratings. These content ratings, which are representative of the user appreciations of each previously accessed content, may be transmitted to the control device D (or its control server CS) either by the user equipments CE (spontaneously (for instance periodically) or on request of the control device D) or by the service provider.

To determine the user content preference(s), the second analyzing module A2 may, for instance, first determine a partition of the users into clusters, from the user content ratings.

For this purpose, based on the collected ratings of contents by users, the second analyzing module A2 may, for instance, create a "conflict graph" in which two users who gave markedly distinct ratings to the same content are linked by a "conflict edge". This graph is then processed to partition users into disjoint clusters which are intended for capturing distinct user profiles.

This clustering can be done by using a novel "spectral clustering" algorithm based on an extraction of spectral features (eigenvalues and associated eigenvectors) of the conflict graph, and more precisely of the so-called Laplacian matrix which is associated with the conflict graph.

When the clustering has been determined, the second analyzing module A2 may, for instance, determine a model of user preference(s) for each cluster.

This last determination of the user preference model of each cluster may be, for instance, based on the application of a maximum likelihood approach to the user content ratings. This is in some sense the most likely model of a particular class of statistical models. For instance one may choose each user preference model into the so-called "Tree-Structured Markov Random Fields class".

Once the model for a given cluster is determined, the second analyzing module A2 may, for instance, use it to determine the contents that are most likely to be of interest to each of its users.

More details of the above described method for determining the user content preference(s) are given in Annex 2.

The computation module CM (of a control device D) is arranged for determining location(s) for storing the replica(s) of each content, from the content replica numbers (determined by the first analyzing module A1) and/or the user's content preferences (determined by the second analyzing module A2). This last determination aims at maximizing the number of times that a given content is stored in the equipment CE of a user who is expected to appreciate it, and therefore it aims at optimizing the access to the contents by the users.

It is important to note that, when the computation module CM has determined each storing location of each content replica, it is preferably arranged for generating recommendations which signal the content(s) to be stored for at least some of the users. In this case, it is also arranged for requiring the transmission of these recommendations to the equipments CE of the corresponding users, through the communication network CN, from its network equipment CS.

A user equipment CE can then follow its dedicated recommendation of content(s) by downloading such content(s), either from at least another user equipment CE (designated in the recommendation) or from at least one content server CTS (designated in the recommendation). This downloading may be possibly subjected to the authorization of the user.

But, the computation module CM may be also arranged for requiring the transmission of the replicas of each content in their corresponding locations from its network equipment CS. In other words the content replica transmission can be done automatically without informing the user equipments CE.

However, it is of interest to couple this automatic transmission (of at least some of the contents) with an explicit recommendation to the user intended for signaling the contents that have been "proactively" (automatically) stored in the memory of its equipment CE.

The invention can also be considered in terms of a method intended for optimizing the access to contents by users comprising communication equipments CE coupled to a communication network CN.

Such a method may be implemented by means of a device D such as the one above described with reference to the unique FIGURE. Therefore, only its main characteristics will be mentioned hereafter.

The method according to the invention comprises the main following steps:
  determining respective popularities of contents of a collection from at least user information, and then determining a number of replicas for each content of this collection from at least its determined content popularity,
  and/or determining content preference(s) of users from content ratings,
  and determining location(s) for storing the replica(s) of each content from the determined content replica numbers and/or the determined user's content preferences.

The invention is not limited to the embodiments of method and control device described above, only as examples, but it encompasses all alternative embodiments which may be considered by one skilled in the art within the scope of the claims hereafter.

ANNEX 1

I-Assumptions and Notations

One considers a system comprising P peer nodes (or user equipments CE) and I infrastructure nodes or content distribution nodes (CDN) (or content servers CTS) intended for allowing users to access F distinct contents (such as movies) (f=1 to F). Movie f is assumed to last for $T_f$ seconds, and to be encoded at some fixed rate $B_f$. One assumes that duration and encoding rates are movie-independent. So, they are denoted by T and B respectively.

Each peer node (CS) offers a storage space of size M and an uplink bandwidth capacity $B_P$ to the system. Each infrastructure node (CTS) offers an uplink bandwidth capacity $B_I$. Moreover one assumes that each infrastructure node (CTS) has sufficient storage capacities to keep copies of all F movies.

The amount of memory devoted to movie f is denoted by $M_f$. One assumes this is independent of the peer (user). This is motivated by a scenario where there is no available knowledge of which peer node (CS) is more likely to view one of the F contents (movie). In this context, one considers a flash-crowd scenario where $N_f$ concurrent viewings (or requests) of movie f are initiated for all f=1, . . . , F.

II-Results

II.1—In the first method, i.e. when the $N_f$ concurrent content requests are known in advance, and are sorted in decreasing order ($N_f \geq N_{f+1}$), then an optimal use of memory consists in partitioning the movies into three groups: the most popular movies ($f \leq f_1$), the movies with intermediate popularity ($f \in \{f_1+1, \ldots, f_2\}$) and the least popular movies ($f > f_2$). The most popular movies are cached in full, i.e. $M_f = BT$ for all $f \leq f_1$. The movies with intermediate popularity are cached minimally, i.e. $M_f = (BT)/P$, $f \in \{f_1+1, \ldots, f_2\}$. Finally the least popular movies are not cached at all, i.e. $M_f = 0$, $f > f_2$. The numbers $f_1$ and $f_2$ are determined so that the memory usage of each peer is precisely M, and that the movies with intermediate popularity can be served from other peer nodes (CS), using their dedicated uplink bandwidths $B_P$.

For a total number of concurrent viewings of $\Sigma_f N_f = \epsilon P$ (which corresponds to a fraction $\epsilon$ of peer nodes (CS) concurrently using the system), the requirements in terms of CDN node bandwidth are the largest when all $N_f$ content popularities are equal. In that case, one can show that the total requirement in CDN node bandwidth reads (approximately):

$$B_{CDN} = \epsilon P \max\left(0, B - \frac{M}{TF} - \frac{1}{\epsilon}\right) B_P.$$

Thus in this conservative scenario, one can show that a sufficient condition for the system to be self-sufficient, i.e. to not rely on CDN node support, is that:

$$\epsilon\left(B - \frac{M}{TF}\right) \leq B_P.$$

Under more realistic models of popularity, assuming the Pareto-Zipf distribution $N_f \propto (f+f_0)^{-\alpha}$, for some positive parameters $f_0$ and $\alpha$, one can show that the condition for the system to be self-sufficient is:

$$\epsilon B\left(1 + \frac{f1}{f0}\right)^{1-\alpha} \leq B_P$$

when $\alpha$ is large. In the preceding inequality, the value $f_1$ is determined by:

$$f1 = \left(\frac{MP - FBT}{(p-1)BT}\right).$$

This captures qualitatively the savings due to skewed popularity distributions.

II.2—In the second method, i.e. when the $N_f$ content requests are not known beforehand, but are each defined by random variables, with known expectation $\mu_f$ and variance $\sigma^2_f$, one can show that the optimal content partitioning is no longer determined by a fixed partitioning into three groups of different popularities. Instead, the optimal memory placements $M_f$ are now a function of the stochastic parameters of the requests which can be defined as follows:

$$M_f = \min\left(BT, \max\left(0, BT + a\frac{\mu_f}{\sigma_f^2} - \frac{b}{\sigma_f^2}\right)\right),$$

where a and b are two positive parameters that do not depend on movie f. This differs significantly from the first method (perfectly known $N_f$ content requests) where one need to cache either fully or minimally any movie f. Here, the optimal amount of caching can vary continuously with average popularity $\mu_f$ and the volatility of their popularities, reflected by $\sigma_f^2$.

ANNEX 2

One assumes there is a set of n users u∈U and a set of m items (contents) i∈I. Each user u gives marks (or ratings) ranging from 1 to k to some of the items i. Based on this rating information, one wants to infer future user preference. More specifically one wants to answer questions such as "which rating (or mark) will user u assign to item i, given that all of the user's previous ratings are known?". One denotes by $M_u(i)$ the true value of this rating (or mark).

I-Technique for Defining a Variable Number of Disjoints Clusters

A technique for separating users u into disjoint clusters is described below. Several methods relying on spectral properties of suitable matrices have been developed in the past. The closest to the present technique is that of R. B. Boppana, described in "Eigenvalues and Graph Bisection: An Average-case Analysis", Proc. FOCS 1987, pages 280-285.

One assumes that a conflict matrix A is given. Matrix A is assumed to be symmetric, each entry $A_{ij}$ is assumed to be non-negative, and interpreted as a measure of the disagreement over content ratings between two users i and j in the present "collaborative filtering" context. Diagonal entries $A_{ii}$ all equal 0. For instance, $A_{ij}$ could be set to 1 if the two users issue distinct ratings on at least T different items (movies), for some threshold T. Alternatively, $A_{ij}$ could count the fraction of distinct ratings made by users i and j over the collection of movies they both rated, in which case $A_{ij}$ could take any value between 0 and 1.

The goal is to partition the index set into clusters, so that most conflicts are between indices from distinct clusters. In this context, one considers the Laplacian L of the conflict matrix A, defined by:

$$L_{ij} = \begin{cases} \sum_{k \neq i} A_{ik} & \text{if } i = j, \\ -A_{ij} & \text{if } i \neq j. \end{cases}$$

It is well known that the Laplacian matrix L is non-negative definite, since for any vector x, it holds that $$x'Lx = \sum_{i<j} A_{ij}(x_i - x_j)^2.$$

Let $p_1 \geq p_2 \ldots \geq p_{K-1}$ denote its K-1 largest eigenvalues, and $z(1), \ldots, z(K-1)$ denote orthonormal associated eigenvectors. In order to split the index set into K distinct clusters, one proposes the following algorithm called "Spectral-Clustering":

1: Associate to each index n=1, ..., N the corresponding (K-1)-dimensional vector $z_n:=(z_{n(1)}, \ldots, z_{n(K-1)})$, consisting of the corresponding coordinates of the eigenvectors z(1), ..., z(K-1).
2: Pick M indices n(1), ..., n(M) uniformly at random from {1, ..., N}, for some suitable M.
3: repeat
4: Identify the two indices n(i), n(j) that achieve the smallest Euclidean distance $\|z_{n(i)} - z_{n(j)}\|$ among all M indices.
5: Remove n(j) and set M to M-1.
6: until M=K.
7: The remaining K indices, say n(1), ..., n(K) now serve as cluster representatives. Assign any other index n to that representative that achieves the minimum in $\{\|z_{n(i)} - z_n\|, i=1 \ldots, K\}$.

One will now show that this algorithm successfully recovers some hidden cluster structure under specific statistical assumptions. Namely, one considers a "planted partition" model which is a generalization of the model considered in the above mentioned document of Boppana and in the document of A. Condon et al., "Algorithms for Graph Partitioning on the Planted Partition Model", Proc. 3rd Int. Workshop on Approx. Algorithms for Comb. Opt. Prob.: RANDOM-APPROX '99.

The planted partition model is as follows. Indices are partitioned into K distinct clusters $C_1, \ldots, C_K$. The conflict values $A_{ij}$ are assumed to be random, with values in [0, 1], and independent across all index pairs (i, j), i<j. Moreover, for all i<j, these variables are assumed to verify the following:

$$E(A_{ij}) = \begin{cases} p & \text{if both } i, j \in C_k \text{ for some cluster } C_k, \\ q & \text{if } i \text{ and } j \text{ belong to distinct clusters.} \end{cases}$$

p designates the intra-cluster average conflict, and q designates the inter-cluster average conflict, with typically q>p.

In this context, one has the following Theorem: "Consider a conflict matrix A distributed according to the above planted partition model. Assume that the number of clusters K is fixed, the initial number of indices N is large, and the size of cluster $C_k$ verifies $|C_k| \sim \alpha_k N$ for some fixed positive parameters $\alpha_k$ such that $\min_k \alpha_k > 0$. Assume that the parameters p and q are such that q>p, q-p=$\Omega$(p) (6), $$q - p = \omega_N \frac{\log(N)}{N},$$

where $\lim_{N \to \infty} \omega_N = +\infty$, and $$\max(p(1-p), q(1-q)) \geq 100 \frac{\log(N)}{N}. \quad (7)$$

Let the initial number of candidate cluster representatives M be fixed. Then with probability $1 - K(1 - \min_k \alpha_k)^M - o(1)$, the above algorithm partitions indices into the original clusters, except for at most o(N) mis-classified indices.

II-Technique for Determining a Probabilistic Model of User's Preference(s) for Each Cluster One adopts a probabilistic approach in which it is assumed that there exists a set of m random variables associated with the items $\{X_1, \ldots, X_m\}$ spanning over the rating space $R^*=\{1, \ldots, k\}$ and describing true user preference(s). For each user u one considers its ratings in the form of a rating vector $r_u=(r_1^{(u)}, \ldots, r_m^{(u)})$. This rating vector will be regarded as a sample of the multivariate law of all of the items $X=(X_1, \ldots, X_m) \sim P(\bullet)$. One assumes namely that a user rates items (movies) by sampling this law.

At this stage it is important to note that the observed rating vectors are incomplete. So, one aim of the present method is to predict the missing user valuations. As a workaround, one chooses to introduce an extra state in the rating space: the unobserved state 0. The rating space becomes $R=R^* \cup \{0\}$. One denotes by H(u) the set of items rated by user u: $H(u)=\{i \in I: r_i^{(u)} > 0\}$. So, H(u) can be considered as the history of user u.

The problem to solve takes the following form: for some user u one has to find the probability of unobserved item i getting a mark (or rating) $l \in R^*$ given the incomplete rating vector $r_u$. This probability is denoted by:

$$\sigma_{ui}: R^* \to [0,1] \sigma_{ui}(l) = P[M_u(i)=l] = P[X_i = l | X_j = r_j^{(u)}, \forall j \in H(u), l \neq 0] \quad (1).$$

One now gives the form of the proposed prediction $\hat{M}_u(i)$ for $M_u(i)$. Consider that $\hat{\sigma}_{ui}$ is an estimation of $\sigma_{ui}$ and a random variable ξ having $\hat{\sigma}_{ui}$ as its probability distribution function. Then its expectation $E\hat{\sigma}_{ui}[\xi]$ can be considered as the prediction of the mark (rating) assigned by user u to item i. This estimator minimizes the quadratic error function (or RMSE).

Using the observed rating vectors one builds the empirical probabilities $\tilde{p}_i(l)$ estimating $P[X_i=l]$, where $l \in R$, as well as the joint probabilities $\tilde{p}_{ij}(l_i, l_j)$ estimating $P[X_i=l_i$ and $X_j=l_j]$, where $l_i, l_j \in R$. Note that one takes into account the possibility of an item i which has not been rated. If now one executes an algorithm, such as the so-called Chow-Liu algorithm, with the rating vectors $\{r_1, \ldots, r_n\}$ as inputs, one finds a best tree law estimate T.

Next, one must find $\hat{M}_u(i)$, for some user u and some unrated item i. Using the notation $\overline{A}=I/A$ to denote the complementary of A in I and $v_A$ to denote $(v_i)_{i \in A}$, one sets $$\tilde{\sigma}_{ui}(l) = \frac{\int T(x_i = l, x_{H(u)} = r_{H(u)}^{(u)}, x_{\overline{H(u)}/[i]}) dx_{\overline{H(u)}/[i]}}{\int T(x_{H(u)} = r_{H(u)}^{(u)}, x_{\overline{H(u)}}) dx_{\overline{H(u)}}} = T_{i|H(u)}(l \mid r_{H(u)}^{(u)}). \quad (2)$$

However, $\tilde{\sigma}_{ui}$ describes a probability distribution over the space R. So one needs to eliminate its unobserved state and find $\hat{\sigma}_{ui}$. This can be easily done by considering the random variable "avoiding" 0. In other words, one finds $$\hat{\sigma}_{ui}: R_* \to [0,1] \hat{\sigma}_{ui}(l) = \frac{\tilde{\sigma}_{ui}(l)}{1 - \tilde{\sigma}_{ui}(0)}, l \neq 0. \quad (3)$$

This is a natural way of defining $\hat{\sigma}_{ui}$, since $\sigma_{ui}$ has the form of the expression (1). In order to give a complete description of the present method, an efficient way of computing expression (2) is given below.

One needs to marginalise the tree law with respect to the set of items unobserved by user u, excluding the item of interest i. To do that, one starts at the periphery of the tree. If an unobserved item j is a leaf in T, then it appears in only one factor $$T_{j|\pi(j)}(x_{j|\pi(j)}) = \frac{T_{j,\pi(j)}(x_j, x_{\pi(j)})}{T_{\pi(j)}(x_{\pi(j)})}$$

in T's formula $$T(x) = \prod_{v \in V} T_{v|\pi(v)}(x_v \mid x_{\pi(v)}), \quad (4)$$

where π(v) denotes the parent of node v in tree T. Therefore one can easily integrate T with respect to $x_j$. Thanks to the consistency property $T_u(x_u) = \int T_{uv}(x_u, x_v) dx_v$, $\forall v \neq u$ (5) of the marginal joint laws, the resulting marginal law of $\{X_{\{j\}}\}$ will have the same form as formula (4), the only difference being the replacement of the dependency function π(•) with the one corresponding to the pruned tree T-{j}. By repeating this pruning process, one is left with a subtree which contains item i "surrounded" by a set of items belonging to H(u). This subtree shows however a particular case, as the "interior" (i.e. nodes which are not leaves) of this subtree contains unobserved items, but may also contain rated items. Once one has obtained this tree, continuing the actual marginalisation becomes hard. An analytic approach does not seem feasible for the general formula (4). So, a new technique is used to approach the problem in a different manner.

This new technique is quite straightforward. Since one wishes to find $T_{i|H(u)}(1|r_{H(u)}^{(u)})$, the marginal and pairwise joint laws of the items in T are conditioned on the rated items, one rated item at a time in an iterative procedure. At each step one propagates the "conditioning" through the tree. However, because of the Markov property, one does not need to apply this procedure to the entire tree. One only needs to do so on the subtree containing the item of interest i, which has rated items as leaves and does not contain any rated item within its "interior".

Another way of characterizing this subtree is that any path from a rated item (which is necessarily a leaf) to the item of interest i does not contain any other rated item. Finding this subtree is not difficult. One has simply to do a tree search starting from the node corresponding to i and to stop exploring this tree as soon as a rated node is encountered. Let denote this subtree by T*. At the end of this procedure, one has found exactly the searched conditional probability. It is possible to bring slight improvements to this algorithm, such as eliminating all the unobserved nodes on the longest chain from f instead of a single node. However the worst case complexity will remain roughly the same: quadratic in the number of items and linear in the number of marks (or ratings).

The same procedure can be also used to compute the marginal law of the leaves of T*, $X_F$.

Since at each iteration one finds conditional laws with respect to one more leaf, it makes sense to write $T(x_F) = T_{f_1}(x_{f_1}) T_{f_2|f_1}(x_{f_2}|x_{f_1}) \cdots T_{f_\phi|f_1, \ldots, f_{\phi-1}}(x_{f_\phi}|x_{f_1}, \ldots, f_{\phi-1})$, where $\phi=|F|$. One initialises $T(x_F)$ to 1 and in a main loop, one keeps updating it by multiplying the current law of the current leaf.

So a probabilistic model of user's preference(s) can be determined for each cluster of users (determined according to the technique described in I).

The invention claimed is:

1. A control device, comprising a processor with a memory, for a network equipment connected to a communication network to which are coupled communication equipment of users capable of storing contents, wherein the control device comprises:
   a first analyzing module configured to:
      determine respective popularities of contents of a collection from at least user information and a number of concurrent content requests that are expected from said users for each content of said collection from its determined content popularity,
      determine a partition of said contents into a chosen number of groups from the determined popularities, wherein at least a first group comprises contents whose replicas must be stored into the communication equipment of each user of at least one chosen user group, a second group comprises contents whose replicas must be stored into the communication equipment of one user of at least one chosen user group, and a third group comprises contents whose replicas must be stored into at least one chosen network equipment, and to
      determine a number of replicas for each content of said collection from the determined partition, and
   a computation module configured to determine locations for storing said replicas of each content from at least said determined content replica numbers, in order to optimize the access to these contents by said users.

2. The control device according to claim 1, wherein said first analyzing module is further configured to determine respective popularities of a collection of contents from user information chosen in an information group comprising at least one of the past uses of contents by users, the forecast uses of contents by users, and the appreciations of users relative to previously accessed contents.

3. The control device according to claim 2, wherein it is arranged to receive user's reports comprising user information relative to their past uses of contents and/or their appreciations of previously accessed contents.

4. The control device according to claim 1, wherein said first analyzing module is further configured to determine respective popularities of a collection of contents from additional information relative to network topology.

5. The control device according to claim 4, wherein said network topology information comprises at least information relative to communication capacities and storage capacities of said user communication equipment.

6. Control device according to claim 1, wherein the partition of said contents into a chosen number of groups being determined from said determined number of concurrent content requests and from communication capacities and storage capacities of said user communication equipment.

7. The control device according to claim 1, wherein said first analyzing module is further configured to determine a partition of said contents in a variable number of groups from communication capacities and storage capacities of said user communication equipment and from mean value and variance of numbers of concurrent content requests that are expected from said users for each of said contents of said collection.

8. The control device according to claim 1, wherein said control device further comprises a second analyzing module configured to determine a partition of said users into clusters from said user content ratings, then for determining a model of user preferences for each of said clusters, then for determining the contents that are likely to be of interest to each user of each cluster from its determined user preference model, wherein the computation module is further configured to determine locations for storing replicas of each content from the determined user's content preference.

9. The control device according to claim 8, wherein said second analyzing module is further configured to determine said user preference model of each cluster by applying a maximum likelihood approach to said user content ratings.

10. The control device according to claim 9, wherein said second analyzing module is further configured to determine each user preference model of each cluster into a class of statistical models.

11. The control device according to claim 10, wherein said class of statistical models is called "tree-structured Markov random fields".

12. The control device according to claim 1, wherein said computation module is configured to generate recommendations signaling content(s) to be stored for at least some of said users and for requiring the transmission of said recommendations to the communication equipment of the corresponding users, from its network equipment.

13. The control device according to claim 1, wherein said computation module is configured to require the transmission of the replicas of each content in their corresponding determined locations from its network equipment.

14. Network equipment for a communication network to which are coupled communication equipment of users capable of storing contents, wherein it comprises a control device according to claim 1.

15. A method for optimizing the access to contents by users comprising communication equipment coupled to a communication network, the method comprising:
   determining respective popularities of contents of a collection from at least user information and a number of concurrent content requests that are expected from said users for each content of said collection from its determined content popularity,
   determining a partition of said contents into a chosen number of groups from the determined popularities, wherein at least a first group comprises contents whose replicas must be shored into the communication equipment of each user of at least one chosen user group, a second group comprises contents whose replicas must be stored into the communication equipment of one user of at least one chosen user group, and a third group comprises contents whose replicas must be stored into at least one chosen network equipment,
   determining a number of replicas for each content of said collection from at least the determined partition, and
   determining locations for storing said replicas of each content from at least said determined content replica numbers.

16. The method according to claim 15, further comprising determining respective popularities of a collection of contents from user information chosen in an information group comprising at least one of the past uses of contents by users, the forecast uses of contents by users, and the appreciations of users relative to previously accessed contents.

17. The method according to claim 16, further comprising receiving user reports comprising user information relative to their past uses of contents and/or their appreciations of previously accessed contents.

18. The method according to claim 15, further comprising determining respective popularities of a collection of contents from additional information relative to network topology.

19. The method according to claim 18, wherein said network topology information comprises at least information relative to communication capacities and storage capacities of said user communication equipment.

20. The method according to claim 15, wherein said determining a partition further comprises determining from said determined number of concurrent content requests and from communication capacities and storage capacities of said user communication equipment.

21. The method according to claim 15, wherein said determining a partition further comprises determining a partition of said contents in a variable number of groups from communication capacities and storage capacities of said user communication equipment and from mean value and variance of numbers of concurrent content requests that are expected from said users for each of said contents of said collection.

22. The method according to claim 15, wherein said determining a partition further comprises determining a partition of said users into clusters from said user content ratings, then for determining a model of user preferences for each of said clusters, then for determining the contents that are likely to be of interest to each user of each cluster from its determined user preference model, wherein the computation module is further configured to determine locations for storing replicas of each content from the determined user's content preference.

23. The method according to claim 22, further comprising determining said user preference model of each cluster by applying a maximum likelihood approach to said user content ratings.

24. The method according to claim 22, further comprising determining each user preference model of each cluster into a class of statistical models.

25. The method according to claim 24, wherein said class of statistical models comprises "tree-structured Markov random fields".

26. The method according to claim 15, further comprising generating recommendations signaling contents to be stored for at least some of said users and for requiring the transmission of said recommendations to the communication equipment of the corresponding users, from its network equipment.

27. The method according to claim 15, further comprising requiring the transmission of the replicas of each content in their corresponding determined locations from its network equipment.

* * * * *